(12) United States Patent
Yoshiba et al.

(10) Patent No.: US 6,910,948 B2
(45) Date of Patent: Jun. 28, 2005

(54) NEEDLE BEARING AND METHOD FOR GRINDING BEARING PARTS THEREOF

(75) Inventors: Takeyuki Yoshiba, Kanagawa (JP); Makoto Fujinami, Kanagawa (JP)

(73) Assignee: NSK Ltd., Tokyo (JP)

( * ) Notice: Subject to any disclaimer, the term of this patent is extended or adjusted under 35 U.S.C. 154(b) by 65 days.

(21) Appl. No.: 10/232,570

(22) Filed: Sep. 3, 2002

(65) Prior Publication Data

US 2003/0113051 A1 Jun. 19, 2003

(30) Foreign Application Priority Data

Sep. 27, 2001 (JP) .................................... P. 2001-298524
Sep. 27, 2001 (JP) .................................... P.2001-298525
Apr. 22, 2002 (JP) .................................... P.2002-119451

(51) Int. Cl.[7] ............................................... B24B 1/00
(52) U.S. Cl. ............................................. 451/35; 451/36
(58) Field of Search ........................... 451/32, 34, 35, 451/36, 37, 38, 39, 40

(56) References Cited

U.S. PATENT DOCUMENTS

| | | | |
|---|---|---|---|
| 3,557,807 A | | 1/1971 | Schipke |
| 3,913,994 A | | 10/1975 | Aling et al. |
| 4,435,247 A | | 3/1984 | Basi et al. |
| 4,893,387 A | | 1/1990 | Akamatsu et al. |
| 5,240,590 A | * | 8/1993 | Brar et al. .................. 205/208 |
| 5,512,006 A | * | 4/1996 | Wood et al. .................. 451/39 |
| 5,592,840 A | * | 1/1997 | Miyasaka ....................... 72/53 |
| 5,611,250 A | * | 3/1997 | Narai et al. .................... 74/569 |
| 6,099,391 A | * | 8/2000 | Suzuki et al. ................. 451/39 |
| 6,117,249 A | * | 9/2000 | Erikson et al. ............. 148/226 |
| 6,371,656 B1 | * | 4/2002 | De Vries et al. ............ 384/565 |
| 2002/0077033 A1 | * | 6/2002 | Yajima et al. ................ 451/34 |

FOREIGN PATENT DOCUMENTS

| | | |
|---|---|---|
| EP | 0 121 707 | 10/1984 |
| GB | 2 354 559 | 3/2001 |

* cited by examiner

Primary Examiner—Dung Van Nguyen
(74) Attorney, Agent, or Firm—Sughrue Mion, PLLC

(57) ABSTRACT

It is an object of the invention to provide a needle bearing which can prevent occurrence of flake and seizure in the bearing parts even under such severe lubricating condition as provided by a compressor for a car air conditioner or a planetary unit for an automatic transmission. The needle bearing is structured by barrel grinding the raceway surface of a ring and the surface of a rolling body without using a ceramic-related abrasive such as alumina or silicon carbide.

1 Claim, 11 Drawing Sheets

US 6,910,948 B2

NEEDLE BEARING AND METHOD FOR GRINDING BEARING PARTS THEREOF

BACKGROUND OF THE INVENTION

The present invention relates to a needle bearing which is used in a car air conditioner or in a planetary unit for an automatic transmission.

In a compressor for a car air conditioner or in a planetary unit for an automatic transmission, as a bearing for supporting a thrust load applied to a rotary part, there is used a thrust needle bearing. However, in the compressor for a car air conditioner, since HFC134a (Hydro Fluoro Carbon 134a) or PAG (Polyalkylene glycol) is used as a refrigerant or operating oil, the lubricating condition of the bearing is under a very severe environment. And, the rotation condition of the bearing also ranges widely from high speeds to low speeds, and further the load to be applied to the bearing ranges from a condition of almost no load to a condition of about 5000N; and, depending on the operating conditions of the compressor, these conditions are combined together at random.

Therefore, under the environment requiring such severe lubricating condition, there is required a thrust needle bearing which can provide better lubricating performance and, to satisfy such requirement, conventionally, for example, the surface roughness of a ring or a rolling body is enhanced or, as shown in FIGS. 19A and 19B, in a thrust ring 1, there are formed notches 2 which are used to secure an oil passage. Also, as shown in FIG. 20, in order to secure the passing oil amount of lubricating oil, the collar portions 4 of an outer ring 3 are turned over to thereby increase the opening height h.

However, in the compressor for a car air conditioner or in the planetary unit for an automatic transmission (A/T), originally, since the lubricating condition is very severe, the above-mentioned measures can provide little effect. Also, because the lubricating condition is very severe, for example, there occurs metal contact between the ring and rolling body. Therefore, in case where foreign substances higher in hardness than the rolling body are sticking to the raceway surface of the ring and the pocket inner surface of the retainer to be contacted with the rolling body, the rolling body is worn due to the influence of the foreign substances, thereby raising a fear that the bearing can be flaked or seized.

SUMMARY OF THE INVENTION

The present invention aims at eliminating the above-mentioned drawbacks found in the conventional needle bearing. Accordingly, it is an object of the invention to provide a needle bearing which can prevent the occurrence of the flaking and seizure even under such severe lubricating condition environment as provided by a compressor for a car air conditioner or a planetary unit for an automatic transmission.

In attaining the above object, according to a first aspect of the invention, there is provided a needle bearing comprising: a retainer having a plurality of pockets; rings; and a plurality of rolling bodies rollably incorporated in the respective pockets of the retainer and rolling on raceway surfaces of the rings, wherein at least one of the retainer, the rolling bodies and the rings is free from a foreign substance having hardness equal to or higher than the hardness of the base material of the rolling bodies.

According to a second aspect of the invention, there is provided a method for grinding bearing parts, wherein, when grinding surfaces of the bearing parts made of metal using abrasives, the abrasives have hardness lower than hardness of base material of the bearing parts, and the surfaces of the bearing parts are grinded using the abrasives by at least one of barrel grinding, shot blasting, and shot peening.

Also, according to a third aspect of the invention, there is provided a needle bearing comprising: a retainer having a plurality of pockets; rings; and a plurality of rolling bodies rollably incorporated in the respective pockets of the retainer and rolling on raceway surfaces of the rings, wherein at least one of the retainer, the rolling bodies and the rings is free from, on the surface thereof, a foreign substance having a mean diameter of larger than 30 $\mu$m.

In the first to third aspects of the invention, as specific means for preventing a foreign substance having hardness equal to or higher than the hardness of the base material of the rolling bodies or a foreign substance having a mean diameter larger than 30 $\mu$m from being present on the surface of the ring, there can be employed a method for barrel working the raceway surface without using a ceramic-related abrasive such as alumina (hardness Hv of 1800 to 2200) or silicon carbide (hardness Hv of 2500 to 3000), that is, a method for barrel working the raceway surface using an abrasive lower in hardness than the base material of the rolling bodies and ring of the bearing. And, in the case of the method using a ceramic-related abrasive, as a post-working step, there is used a barrel polishing method for polishing the needle bearing using plastic material, wall nut material and corn material (coat of corn), or a method for removing the ceramic-related abrasive through a washing operation. By the way, the mean diameter of the foreign substance here means the mean of the major minor diameters of one particle.

According to a fourth aspect of the invention, there is provided a needle bearing comprising: a retainer having a plurality of pockets; rings; and a plurality of rolling bodies rollably incorporated in the respective pockets of the retainer and rolling on raceway surfaces of the rings, wherein, in case where 0.01 mm$^2$ of the surface of at least one of the bearing parts, that is, the retainer, the rolling bodies and the ring is set as a unit area, the rate per unit area of existence of hard foreign substances having hardness equal to or higher than the hardness of the base material of the rolling bodies and sticking to the surfaces of the bearing parts is set equal to or less than 10%. According to a fifth aspect of the invention, there is provided a needle bearing comprising: a retainer having a plurality of pockets; rings; and a plurality of rolling bodies rollably incorporated in the respective pockets of the retainer and rolling on raceway surfaces of the rings, wherein, in case where 0.01 mm$^2$ of the surface of at least one of the bearing parts, that is, the retainer, the rolling bodies and the ring is set as a unit area, the number per unit area of hard foreign substances having hardness equal to or higher than the hardness of the base material of the rolling bodies and sticking to the surfaces of the bearing parts is set equal to or less than 300.

DETAILED DESCRIPTION OF THE PREFERRED EMBODIMENTS

Now, description will be given below of the preferred embodiments of a needle bearing according to the invention with reference to the accompanying drawings.

Figure 1:
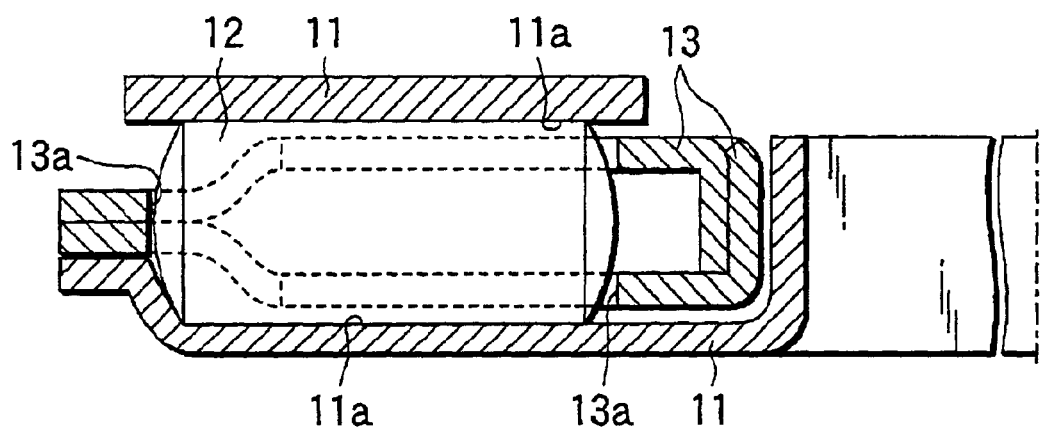
FIG. 1 is a section view of the structure of a needle bearing according to an embodiment of the invention.

FIG. 1 is a section view of the structure of a needle bearing according to an embodiment of the invention. As shown in FIG. 1, a needle bearing according to the present embodiment of the invention comprises a ring 11, a plurality of rolling bodies (needle-like rollers) 12, and a retainer 13.

The ring (hardness Hv of 650 to 800) 11, rolling bodies (hardness Hv of 700 to 800) 12 and retainer (hardness Hv of 650 to 800) 13 are respectively made of metal such as SUJ2.

In the retainer 13, there are opened up a plurality of pockets (not shown) for holding the rolling bodies 12 in a rollable manner, while the pockets are disposed at regular intervals in the circumferential direction of the ring 11. Also, the rolling bodies 12 as well as the raceway surface 11a of the ring 11 and the pocket inner surfaces 13a of the retainer 13 to be contacted with the rolling bodies 12 are worked by barrel grinding using an abrasive (such as a glass bead (hardness Hv of 400 to 500) and a metal ball (hardness Hv of 400 to 600)) lower in hardness than the base material of bearing parts such as the rolling bodies 12 and ring 11 in order to remove scales and burrs produced when the present needle bearing is heat treated.

When barrel grinding the bearing parts of the thrust needle bearing, in case where the surfaces of the bearing parts are ground using an abrasive lower in hardness than the base material of the bearing parts, there can be obtained the following effect. That is, even incase where the abrasives are not removed perfectly in a washing step after a grinding operation but the abrasives are left on the surfaces of the bearing parts, when the thrust needle bearing is in actual use, the remaining abrasives are bitten into and crushed in, for example, between the thrust ring 11 and rolling bodies 12. Therefore, even in case where the abrasives are left on the surfaces of the bearing parts, they exist no longer as foreign substances which are higher in hardness than the base material of the bearing parts, thereby being able to reduce the influence of the abrasives remaining on the surfaces of the bearing parts.

Figure 2:
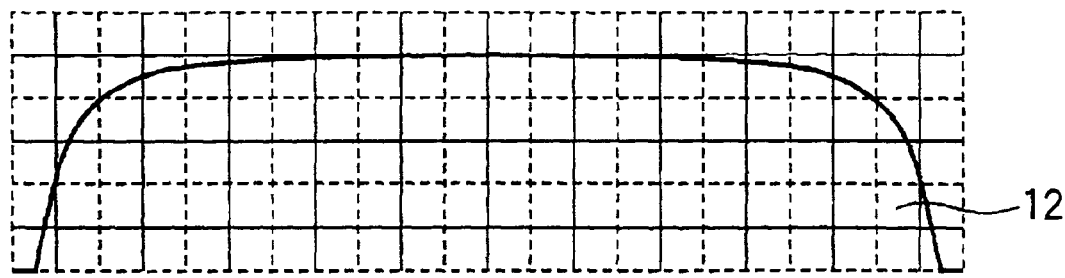
FIG. 2 is a graphical representation of the bus shape of the surface of a rolling body obtained when glass beads are used as abrasives.
Figure 3:
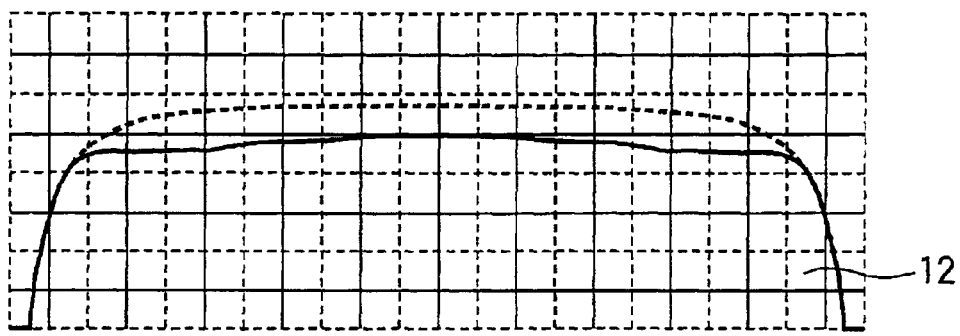
FIG. 3 is a graphical representation of the bus shape of the surface of a rolling body obtained when alumina oxide is used as abrasives.

To confirm the above effect, the present inventors, using a thrust needle bearing having an inside diameter of 40 mm, an outside diameter of 60 mm and a thickness of 5 mm (rated dynamic load: 24000N) as a test bearing, have conducted a rolling body wear resistance test under the following test conditions: that is, the axial load: 2000N, the radial load: 0N, the rotation speed: 2000 $min^{-1}$, lubricating oil: kerosene (PAG=9:1), and test time: 48 hrs. And, after completion of the test, the present inventors have observed the rolling body surfaces of the respective test bearings. FIGS. 2 and 3 show the results of our observation.

Specifically, FIG. 2 shows the bus shape of the rolling body surface when glass beads (#120, diameter of the order of 0.1 to 0.2 mm) were used as the abrasives, whereas FIG. 3 shows the bus shape of the rolling body when aluminum oxide was used as the abrasives.

As can be seen from the observation results shown in FIGS. 2 and 3, when aluminum oxide was used as the abrasives, in 48 hrs. after start of the test, the rolling body 12 wore down to a position shown by a solid line in FIG. 3. On the other hand, in case where glass beads were used as the abrasives, when compared with the case using aluminum oxide as the abrasives, the wear of the rolling body 12 was improved greatly.

The above observation results show the following facts. That is, when barrel grinding bearing parts made of metal, preferably, the surfaces of the bearing parts may be ground using abrasives having lower hardness than the base material of the bearing parts. Specifically, because the hardness of the abrasives is lower than that of the base material of the bearing parts, even in case where the abrasives are not removed perfectly in a washing step after a grinding operation but the abrasives are left on the surfaces of the bearing parts, when the thrust needle bearing is in actual use, the remaining abrasives are bitten into and crushed in, for example, between the thrust ring 11 and rolling body 12. Therefore, even in case where the abrasives are left on the surfaces of the bearing parts, they exist no longer as foreign substances which are higher in hardness than the base material of the bearing parts, thereby being able to reduce the influence of the abrasives remaining on the surfaces of the bearing parts.

By the way, the invention is not limited to the above-mentioned embodiment. For example, in the above embodiment, as the abrasives for grinding the surfaces of the bearing parts, there are used glass beads; however, as the abrasives, there can also be used a metal ball (diameter of about 1 mm) lower in hardness than the base material of the bearing parts. Also, in the above embodiment, the surfaces of the bearing parts are worked by barrel grinding. However, they may also be worked by shot blasting or by shot peening.

By the way, the inventors observed the bearing as to the wear conditions generated therein and found, in the raceway surface and rolling bodies, not only bitten traces caused by foreign substances such as worn metal powder but also worn states caused by microscopic foreign substances. When observing these bitten traces and worn states in more detail, it has been confirmed that the same bitten traces and worn states are repeatedly left in the raceway surface and rolling bodies of the bearing.

The above observation results suggest that the bearing is worn due to mixture of the foreign substances into the raceway surface and rolling bodies: that is, it is assumed that the foreign substances are fixed to the raceway surface and rolling body (the foreign substances are buried into one of the raceway surface and rolling body which is lower in hardness), the thus buried foreign substances repeatedly damage the rolling body to thereby cause the rolling body to wear.

Thus, the present inventors also observed the raceway surface and rolling body of the bearing as to their initial states before they are worn due to the foreign substances. According to the results of this observation, it has been confirmed that, in the initial states as well, there are repeatedly caused similar bitten traces to the above case. Further, on the raceway surface of the bearing in the initial state, the presence of the foreign substance was also confirmed and, when the foreign substance was checked for the component thereof, the component was found a ceramic component such as aluminum oxide which is a non-metal component.

Further, when the raceway surface of a bearing, which had not been used, was observed, such ceramic-related foreign substance as mentioned above, such as alumina, was found. This shows a possibility that the foreign substance has been already stuck to the bearing when assembly of the bearing is completed. It is believed that a media (an abrasive) and a compound used when the bearing is worked by barrel grinding are left on the raceway surface of the bearing to provide such foreign substance.

The above observations and assumptions show a possibility that a small amount of media remaining on the raceway surface of the bearing can cause the bearing to wear and thus can shorten the life of the bearing greatly.

To confirm the above possibility, the present inventors, using a thrust needle bearing having an inside diameter of 40 mm, an outside diameter of 60 mm and a thickness of 5 mm (rated dynamic load: 24000N) as a test bearing, have conducted a rolling body wear resistance test under the following test conditions: that is, the axial load: 2000N, the radial load: 0N, the rotation speed: 2000 $min^{-1}$, lubricating oil: kerosene (PAG=9:1), and test time: 48 hrs. And, the number of foreign substances per unit area existing on the bearing raceway surface and the maximum diameter of the foreign substances were confirmed through an electronic microscope before start of the test; and, after completion of the test, the rolling body wear amounts of the respective test bearings were measured. Table 1 shows the results of the measurement.

TABLE 1

| Sample Nos. | Abrasive used in barrel grinding | Number of foreign substances | Maximum diameter of foreign substance ($\mu$m) | Bearing wear Amounts ($\mu$m) |
| --- | --- | --- | --- | --- |
| 1 | No abrasive | 3 | 5 | 0 |
| 2 | No abrasive | 5 | 11 | 0 |
| 3 | No abrasive | 9 | 32 | 0 |
| 4 | No abrasive | 5 | 43 | 10 |
| 5 | Alumina | 7 | 7 | 0 |
| 6 | Alumina | 18 | 26 | 0 |
| 7 | Alumina | 20 | 32 | 1 |
| 8 | Alumina | 17 | 52 | 10 |
| 9 | Silicon carbide | 14 | 33 | 1 |
| 10 | Silicon carbide | 23 | 53 | 15 |

In Table 1, sample numbers 1 to 4 show sample bearings which are assembled using rings on which barrel working (grinding operation) is not enforced, whereas sample numbers 5 to 8 show sample bearings on which alumina is used as a media or as an abrasive when they are worked by barrel grinding. Also, sample numbers 9 and 10 show sample bearings on which silicon carbide is used as an abrasive when they are worked by barrel grinding. By the way, in Table 1, the maximum diameter of a foreign substance means the greatest one of the means of the major diameter and minor diameter of one particle.

Figure 4:
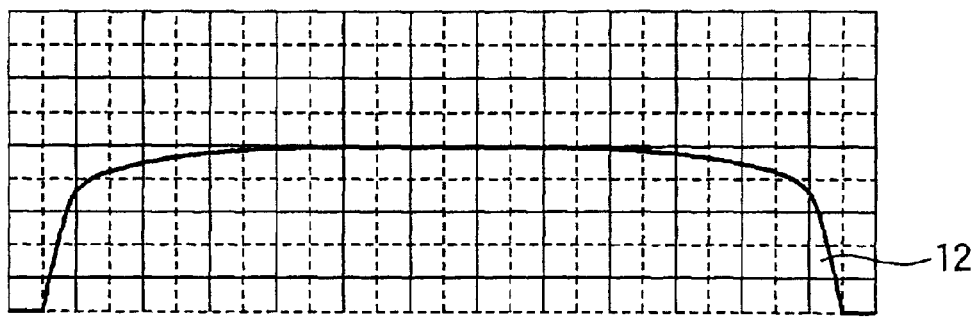
FIG. 4 shows the shape of a bus of a rolling body used in a sample bearing, sample No. 1, shown in Table 1 before and after a wear test is conducted.
Figure 5:
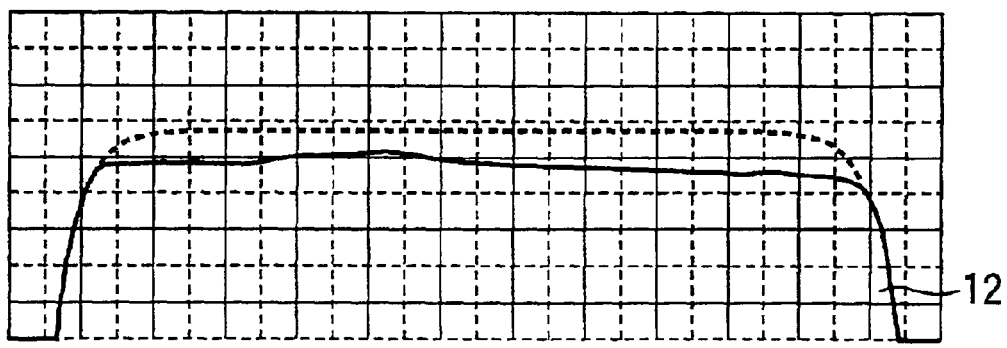
FIG. 5 shows the shape of a bus of a rolling body used in a sample bearing, sample No. 4, shown in Table 1 before and after a wear test is conducted.
Figure 6:
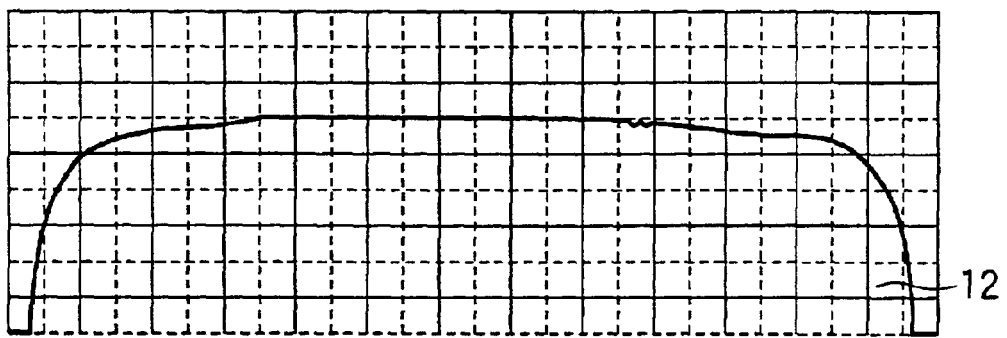
FIG. 6 shows the shape of a bus of a rolling body used in a sample bearing, sample No. 5, shown in Table 1 before and after a wear test is conducted.
Figure 7:
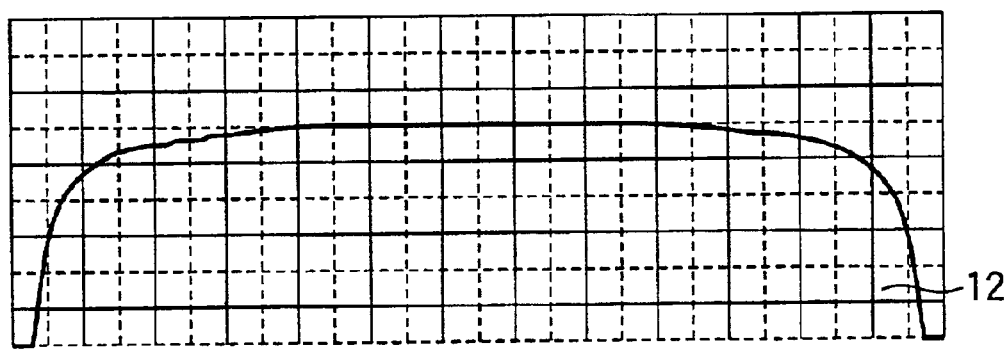
FIG. 7 shows the shape of a bus of a rolling body used in a sample bearing, sample No. 9, shown in Table 1 before and after a wear test is conducted.
Figure 8:
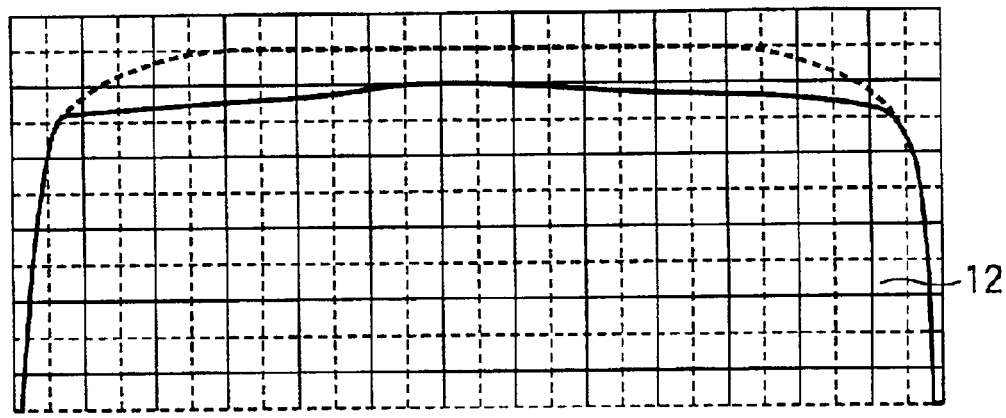
FIG. 8 shows the shape of a bus of a rolling body used in a sample bearing, sample No. 8, shown in Table 1 before and after a wear test is conducted.

Also, the present inventors have observed the surfaces of the rolling bodies of the respective sample bearings after completion of the above test. FIGS. 4 to 8 show the results of this observation. Here, FIG. 4 shows the bus shape of the rolling body in the sample bearing which is designated by the sample No. 1, FIG. 5 shows the bus shape of the rolling body in the sample bearing designated by the sample No. 4, FIG. 6 shows the bus shape of the rolling body in the sample bearing designated by the sample No. 5, FIG. 7 shows the bus shape of the rolling body in the sample bearing designated by the sample No. 9, and FIG. 8 shows the bus shape of the rolling body in the sample bearing designated by the sample No. 8, respectively. Also, in each of these figures, a broken line shows the bus shape of the rolling body before start of the test, whereas a solid line shows the bus shape of the rolling body after completion of the test.

From the bus shapes of the rolling bodies shown in FIGS. 4 to 8, there can be confirmed the following facts: that is, in the case of the sample bearing No. 1, since no abnormal condition is found in the shape of the rolling body, it is confirmed that the sample bearing No. 1 has not been worn. Also, in the case of the sample bearing No. 4, the shape of the bus of the rolling body of the sample bearing provides such shape as shown by a broken line before the test, whereas it provides such shape as shown by a solid line after the test; and, therefore, it is confirmed that the sample No. 4 has been worn. Further, in the case of the sample bearings Nos. 5 and 9, the media was removed from them by a washing treatment after completion of barrel grinding and thus the ceramic-related media having a mean diameter of 30 μm was not found on the raceway surfaces of these sample bearings; and therefore, it is confirmed that the rolling bodies have not been worn by foreign substances. In addition, in the case of the sample bearing No. 8, it is confirmed that the rolling body thereof has been worn up to such a position as shown by a solid line due to the ceramic-related media remaining on the raceway surface of the sample bearing.

From the above test, we can reach the following conclusion. That is, in case where a needle bearing is structured such that at least one of the ring, rolling body and retainer of the needle bearing does not include on the surface thereof a foreign substance equal to or higher in hardness than the base material of the needle bearing, or a substance having a mean diameter larger 30 μm, the ring and rolling body can be prevented from wearing. Therefore, even under such severe lubricating conditions as provided by a compressor for a car air conditioner and a planetary unit for automatic transmission, the bearing parts can be prevented from being flaked or seized.

Next, the present inventors, in order to check the remaining abrasives for the influence thereof, conducted a bearing wear test under the following test conditions I employing not only needle bearings which had been worked by barrel grinding using an alumina-related abrasive (media) but also needle bearings worked by barrel grinding using a silicon-carbide-related abrasive. And, before the test, the rate per unit area (which is 0.01 mm$^2$ of the ring way surface of a bearing) of the remaining abrasive was measured; and, after the test, the wear amounts of the rolling bodies of the respective needle bearings were measured. Table 2 shows the results of these measurements.

Test Conditions I
(1) Sample bearing: Thrust needle bearing having: Inside diameter: 40 mm, Outside diameter: 60 mm, Thickness: 5 mm, Rated dynamic load: 24000N,
(2) Axial load: 3000N
(3) Radial load: 0N
(4) Rotation speed: 1800 min$^{-1}$
(5) Lubricating oil: Kerosene (PAG=9:1)
(6) Test time: 48 hrs.

In Table 2, sample Nos. 11 to 13 designate thrust needle bearings in which, after they were worked by barrel grinding, the raceway surfaces of the bearings were washed and the media was removed therefrom; sample Nos. 15 to 19 designate thrust needle bearings in which, as an abrasive in barrel working, there was used alumina; and, sample Nos. 20 to 22 designate thrust needle bearings in which, as an abrasive in barrel working, there was used silicon carbide.

As can be clearly understood from the measurement results shown in Table 2, the thrust needle bearings designated by the sample Nos. 11, 12, 14, 16 to 22 are smaller in the bearing wear amount than the thrust needle bearings designated by the sample Nos. 13 and 15. The reason for this is believed that, in the case of the thrust needle bearings, sample Nos. 13 and 15, the rate per unit area of the remaining abrasive exceeds 10%, whereas in the case of the thrust needle bearings, sample Nos. 11, 12, 14, 16 to 22, the rate per unit area of the remaining abrasive is equal to or less than 10%.

Figure 9:
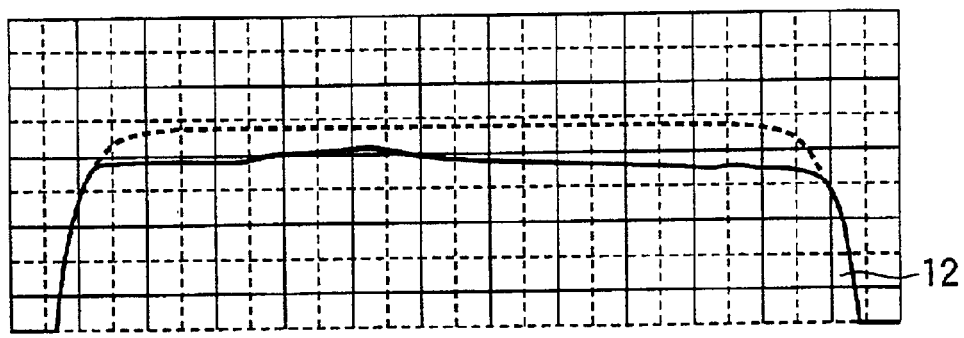
FIG. 9 shows the shape of a bus of a rolling body used in a sample bearing, sample No. 11, shown in Table 2 before and after a wear test is conducted.
Figure 10:
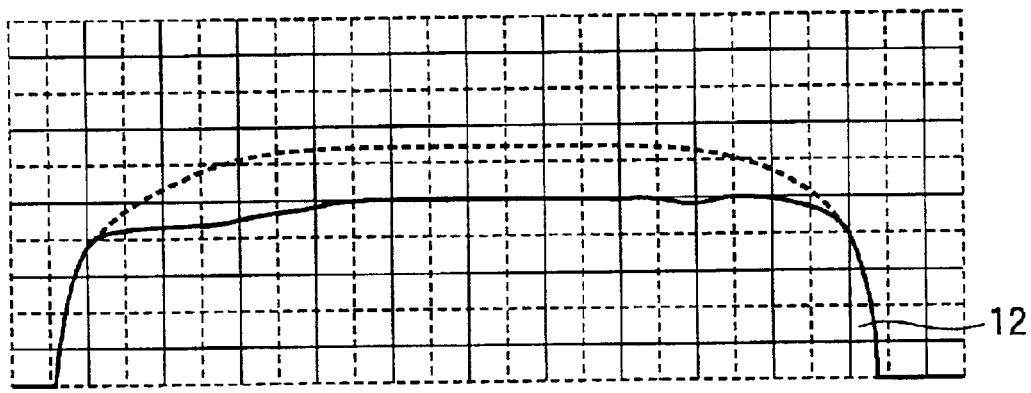
FIG. 10 shows the shape of a bus of a rolling body used in a sample bearing, sample No. 13, shown in Table 2 before and after a wear test is conducted.
Figure 11:
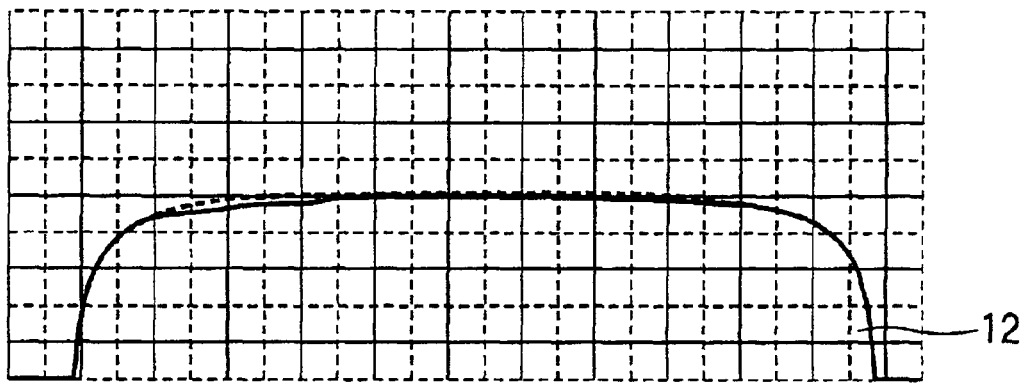
FIG. 11 shows the shape of a bus of a rolling body used in a sample bearing, sample No. 18, shown in Table 2 before and after a wear test is conducted.
Figure 12:
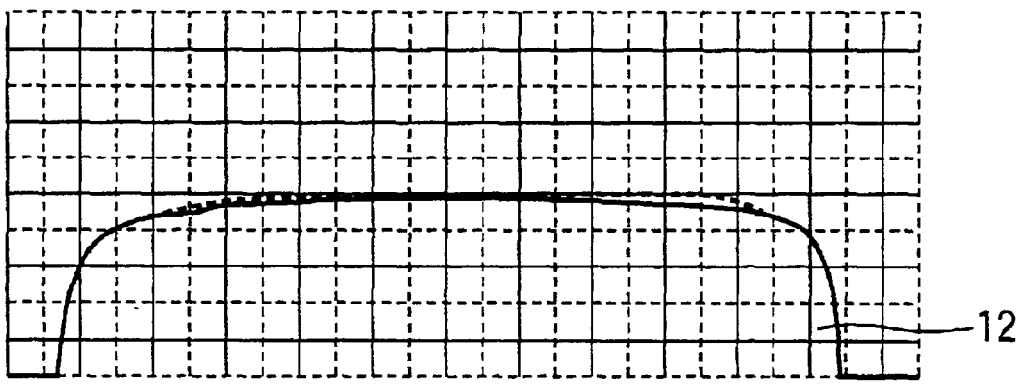
FIG. 12 shows the shape of a bus of a rolling body used in a sample bearing, sample No. 22, shown in Table 2 before and after a wear test is conducted.
Figure 13:
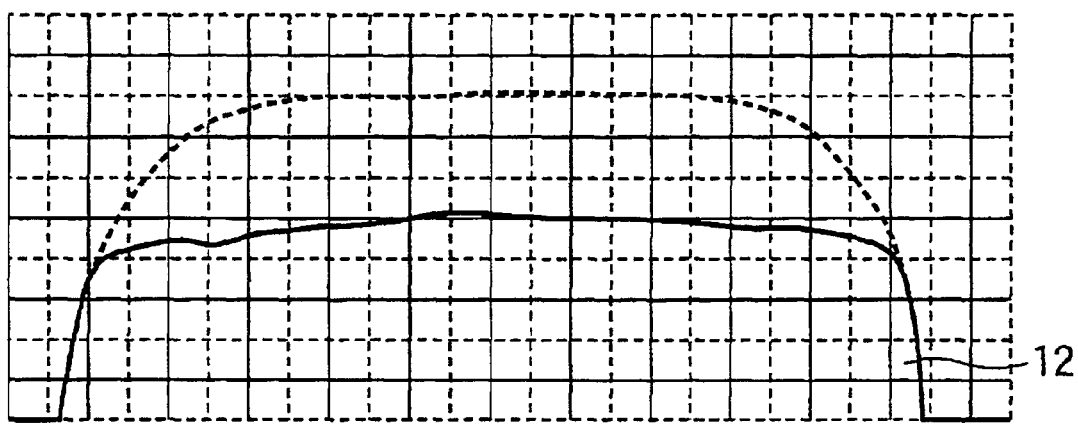
FIG. 13 shows the shape of a bus of a rolling body used in a sample bearing, sample No. 15, shown in Table 2 before and after a wear test is conducted.

Also, the inventors observed the rolling body bus shapes of the respective bearings after completion of the above test. FIGS. 9 to 13 show the results of this observation. Here, FIG. 9 shows the rolling body bus shape of the bearing, sample No. 11; FIG. 10 shows the rolling body bus shape of the bearing, sample No. 13; FIG. 11 shows the rolling body bus shape of the bearing, sample No. 18; FIG. 12 shows the rolling body bus shape of the bearing, sample No. 22; FIG. 13 shows the rolling body bus shape of the bearing, sample No. 15, respectively. Also, in each of these figures, a broken line shows the bus shape of the rolling body before the test was started, whereas a solid line shows the bus shape of the rolling body before the test was ended.

As can also be clearly seen from the rolling body bus shapes shown in FIGS. 9 to 13, in the case of the needle bearings, sample Nos. 11, 18, 22, no abnormal condition is found in the bus shapes of the rolling bodies thereof and thus it is confirmed that the rolling bodies have been little worn. On the other hand, in the case of the needle bearings, sample Nos. 13 and 15, an abnormal condition is found in the bus shapes of the rolling bodies thereof and thus it is confirmed that the rolling bodies have been worn.

From the above test results, the inventors can reach the following conclusion. That is, when 0.01 mm$^2$ of the raceway surface is used as a unit area, in case where the rate per unit area of a hard foreign substance such as the remaining abrasive is set equal to or less than 10%, the amount of wear of the bearing parts due to the foreign substance such as the remaining abrasive can be reduced, which makes it possible to prevent occurrence of flaking and seizure in the bearing parts.

Next, the inventors, in order to check the remaining abrasive for the influence thereof, conducted a bearing wear

TABLE 2

| Sample Nos. | Abrasive used in barrel grinding | Area occupied by foreign substance (%) | Bearing wear Amounts (μm) | Judgment | FIG. |
|---|---|---|---|---|---|
| 11 | No abrasive | 3% or less | 0 | Good | 7 |
| 12 | No abrasive | 7 | 2 | Good | — |
| 13 | No abrasive | 21 | 7 | No good | 8 |
| 14 | No abrasive | 13 | 3 | Good | — |
| 15 | Alumina | 22 | 15 | No good | 11 |
| 16 | Alumina | 5 | 5 | Good | — |
| 17 | Alumina | 7 | 4 | Good | — |
| 18 | Alumina | 12 | 1 | Good | 9 |
| 19 | Alumina | 9 | 0 | Good | — |
| 20 | Silicon carbide | 13 | 5 | Good | — |
| 21 | Silicon carbide | 4 | 3 | Good | — |
| 22 | Silicon carbide | 11 | 1 | Good | 10 | test under the following test conditions II using not only needle bearings which had been respectively worked by barrel grinding with an alumina-related abrasive (media) but also needle bearings respectively worked by barrel grinding with a silicon-carbide-related abrasive. And, before the test, the number per unit area (which is 0.01 mm² of the raceway surface of a bearing) of the remaining abrasive was measured; and, after the test, the wear amounts of the rolling bodies of the respective needle bearings were measured. Table 3 shows the results of these measurements.

Test Conditions II
(1) Sample bearing: Thrust needle bearing having: Inside diameter: 40 mm, Outside diameter: 60 mm, Thickness: 5 mm, Rated dynamic load: 24000N,
(2) Axial load: 2000N
(3) Radial load: ON
(4) Rotation speed: 2000 min⁻¹
(5) Lubricating oil: Kerosene (PAG=9:1)
(6) Test time: 48 hrs.

TABLE 3

| Sample Nos. | Abrasive used in barrel grinding | Number of foreign substances | Bearing wear Amounts ($\mu$m) | Judgment | FIG. |
|---|---|---|---|---|---|
| 31 | No abrasive | 3 | 0 | Good | 12 |
| 32 | No abrasive | 280 | 2 | Good | 13 |
| 33 | No abrasive | 340 | 6 | No good | — |
| 34 | No abrasive | 320 | 3 | Good | — |
| 35 | No abrasive | 300 | 3 | Good | — |
| 36 | Alumina | 320 | 2 | Good | — |
| 37 | Alumina | 285 | 3 | Good | 14 |
| 38 | Alumina | 135 | 1 | Good | — |
| 39 | Alumina | 390 | 10 | No good | 16 |
| 40 | Alumina | 320 | 7 | No good | — |
| 41 | Silicon carbide | 250 | 4 | Good | — |
| 42 | Silicon carbide | 280 | 4 | Good | 15 |
| 43 | Silicon carbide | 330 | 5 | Good | — |

In Table 3, sample Nos. 31 to 35 designate thrust needle bearings in which, after they were worked by barrel grinding, the raceway surfaces of the bearings were washed and the media was removed therefrom; sample Nos. 36 to 40 designate thrust needle bearings in which, as an abrasive in barrel working, there was used alumina; and, sample Nos. 41 to 43 designate thrust needle bearings in which, as an abrasive in barrel working, there was used silicon carbide.

As can be clearly seen from the measurement results shown in Table 3, the thrust needle bearings respectively designated by the sample Nos. 31, 32, 34 to 38, and 41 to 43 are smaller in the bearing wear amount than the thrust needle bearings respectively designated by the sample Nos. 33, 39, and 40. The reason for this is believed that, in the case of the thrust needle bearings, sample Nos. 33, 39, and 40, the number per unit area of the remaining abrasives exceeds 300, whereas in the case of the thrust needle bearings, sample Nos. 31, 32, 34 to 38, and 41 to 43, the number per unit area of the remaining abrasives is equal to or less than 300.

Figure 14:
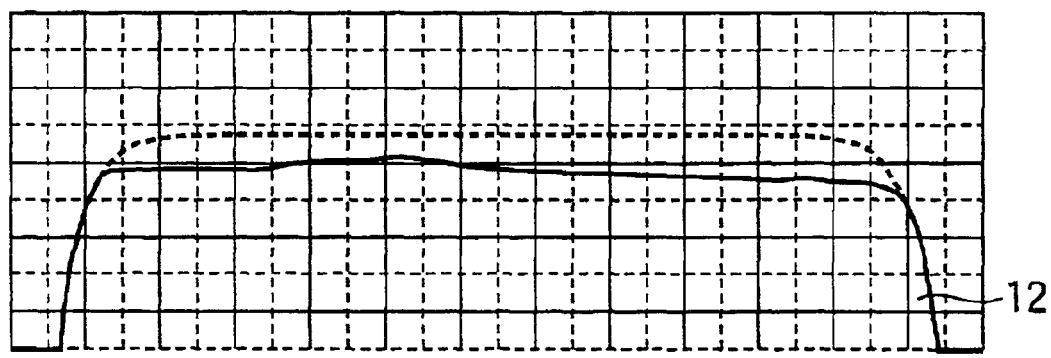
FIG. 14 shows the shape of a bus of a rolling body used in a sample bearing, sample No. 31, shown in Table 3 before and after a wear test is conducted.
Figure 15:
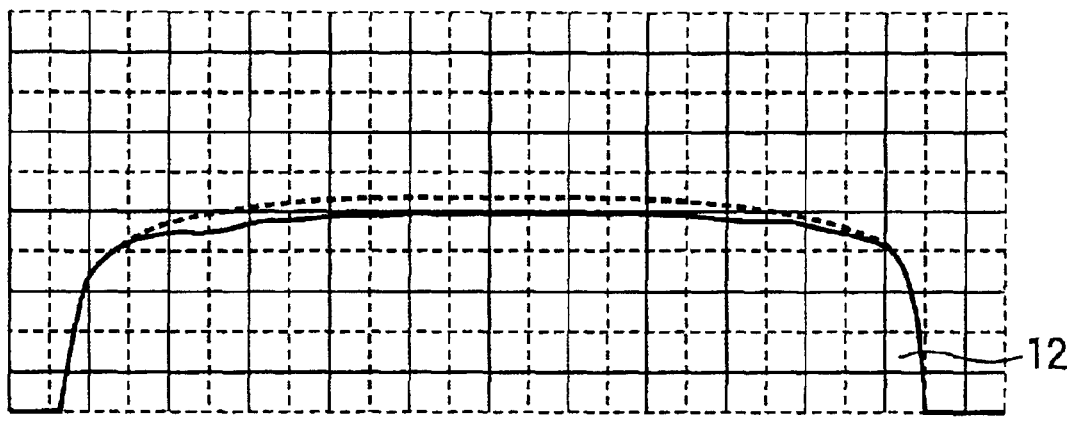
FIG. 15 shows the shape of a bus of a rolling body used in a sample bearing, sample No. 32, shown in Table 3 before and after a wear test is conducted.
Figure 16:
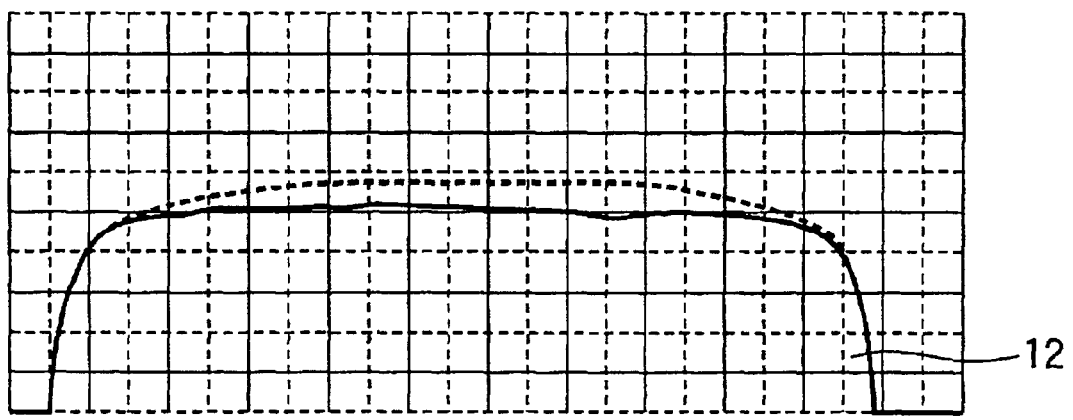
FIG. 16 shows the shape of a bus of a rolling body used in a sample bearing, sample No. 37, shown in Table 3 before and after a wear test is conducted.
Figure 17:
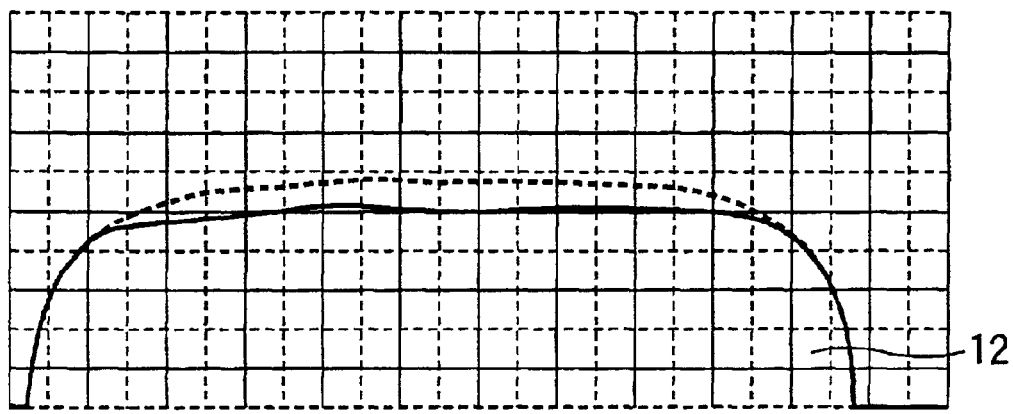
FIG. 17 shows the shape of a bus of a rolling body used in a sample bearing, sample No. 42, shown in Table 3 before and after a wear test is conducted.
Figure 18:
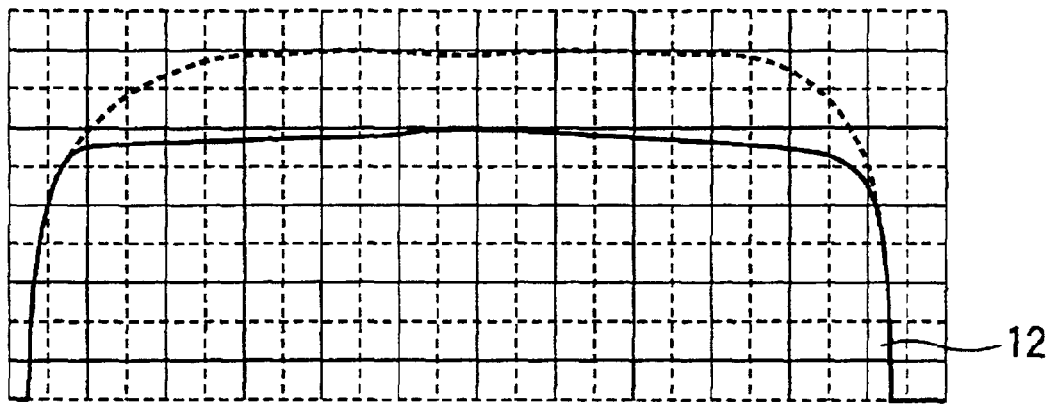
FIG. 18 shows the shape of a bus of a rolling body used in a sample bearing, sample No. 39, shown in Table 3 before and after a wear test is conducted.
Figure 19A:
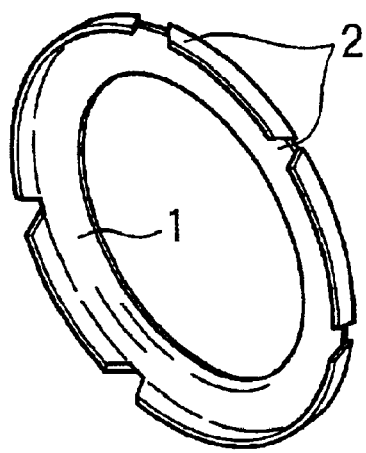
FIGS. 19A and 19B are a perspective view of a thrust ring used in a conventional thrust needle bearing; and, FIG. 20 is a section view of the structure of a conventional radial needle bearing.
Figure 19B:
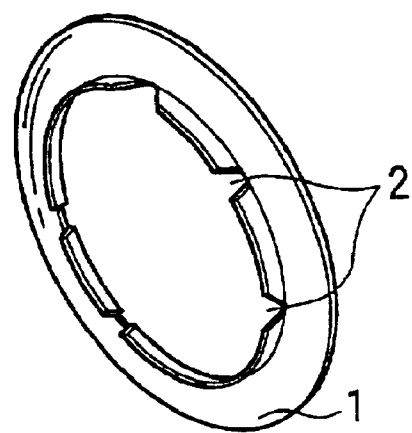
Figure 20:
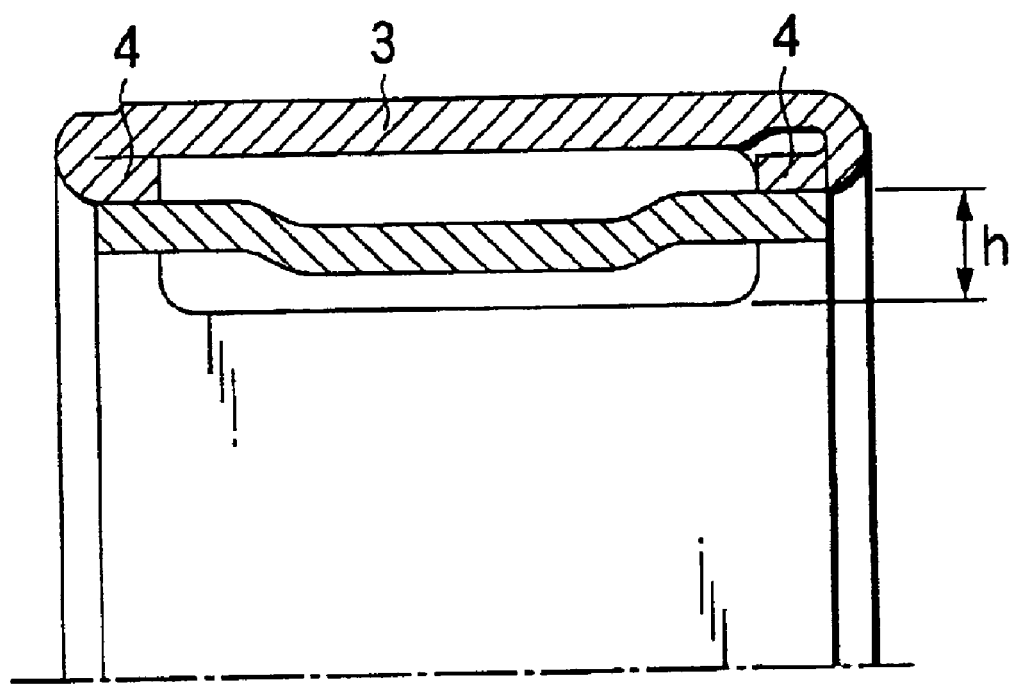

Also, the inventors observed the rolling body bus shapes of the respective bearings after completion of the above test. FIGS. 14 to 18 show the results of this observation. Here, FIG. 14 shows the rolling body bus shape of the bearing, sample No. 31; FIG. 15 shows the rolling body bus shape of the bearing, sample No. 32; FIG. 16 shows the rolling body bus shape of the bearing, sample No. 37; FIG. 17 shows the rolling body bus shape of the bearing, sample No. 42; and, FIG. 18 shows the rolling body bus shape of the bearing, sample No. 39, respectively. Also, in each of these figures, a broken line shows the bus shape of the rolling body before the test was started, whereas a solid line shows the bus shape of the rolling body before the test was ended.

As can also be clearly seen from the rolling body bus shapes shown in FIGS. 14 to 18, in the case of the needle bearings, sample Nos. 31, 32, 37 and 42, no abnormal condition is found in the bus shapes of the rolling bodies thereof and thus it is confirmed that the rolling bodies have been little worn. On the other hand, in the case of the needle bearing, sample No. 39, an abnormal condition is found in the bus shape of the rolling body thereof and thus it is confirmed that the rolling body has been worn.

From the above test results, the inventors can reach the following conclusion. That is, when 0.01 mm² of the raceway surface is used as a unit area, in case where the number per unit area of hard foreign substances such as the remaining abrasives is set equal to or less than 300, the amount of wear of the bearing parts due to the foreign substances such as the remaining abrasives can be reduced, which makes it possible to prevent occurrence of flaking and seizure in the bearing parts.

By the way, the invention is not limited to the above illustrated embodiments. For example, in the above illustrated embodiments, the invention is applied to a thrust needle bearing but, of course, the invention can also be applied to a radial needle bearing. In the case of the radial needle bearing, there can also be employed specifications in which a cage and rollers (a retainer and rolling bodies) are employed, and the rolling bodies thereof are all composed of rollers.

As has been described heretofore, according to the first to third aspects of the invention, since foreign substances higher in hardness than the base material of rolling bodies exist no longer on the surface of the ring, the surface of the rolling body and the inner surface of the retainer, even under such severe lubricating conditions as provided by a compressor for a car air conditioner and a planetary unit for automatic transmission, the bearing parts can be prevented from being flaked or seized.

And, according to the fourth and fifth aspects of the invention, because the wear amounts of the bearing parts due to the foreign substances such as the remaining abrasives can be reduced, the bearing parts can be prevented from being flaked or seized.

What is claimed is:
1. A method for grinding bearing parts, comprising:
   heat treating the bearing parts made of metal; and
   grinding surfaces of the bearing parts using abrasives by barrel grinding, the abrasives having hardness lower than hardness of base material of the bearing parts.

* * * * *